US006968059B1

(12) United States Patent
Kimura

(10) Patent No.: US 6,968,059 B1
(45) Date of Patent: Nov. 22, 2005

(54) VIDEO INFORMATION GENERATING APPARATUS, VIDEO COMMUNICATION TERMINAL, VIDEO DISTRIBUTION SERVER, AND VIDEO INFORMATION SYSTEM

(75) Inventor: Junichi Kimura, Koganei (JP)

(73) Assignee: Hitachi, Ltd., Tokyo (JP)

( * ) Notice: Subject to any disclaimer, the term of this patent is extended or adjusted under 35 U.S.C. 154(b) by 877 days.

(21) Appl. No.: 09/635,629

(22) Filed: Aug. 10, 2000

(30) Foreign Application Priority Data

Jul. 18, 2000 (JP) ............................. 2000-222389

(51) Int. Cl.$^7$ ........................ H04N 7/167; H04N 7/173
(52) U.S. Cl. ..................... 380/201; 380/202; 380/203; 380/211; 705/52; 705/54; 705/57; 705/58; 725/86; 725/87
(58) Field of Search ................................ 380/201, 202, 380/203, 211, 233, 241; 705/51, 52, 54, 55, 705/57, 58, 59; 713/201; 725/1, 25, 28, 29, 725/30, 86, 87, 88, 89, 91

(56) References Cited

U.S. PATENT DOCUMENTS

| | | | | |
|---|---|---|---|---|
| 4,862,290 A | * | 8/1989 | Jung et al. .................. | 386/107 |
| 5,799,081 A | | 8/1998 | Kim et al. ..................... | 380/5 |
| 5,991,500 A | * | 11/1999 | Kanota et al. ................ | 386/94 |
| 6,002,694 A | * | 12/1999 | Yoshizawa et al. ......... | 380/233 |
| 6,282,293 B1 | * | 8/2001 | Itoh et al. .................... | 380/233 |
| 6,401,243 B1 | * | 6/2002 | Suzuki ........................ | 725/86 |

FOREIGN PATENT DOCUMENTS

| | | | |
|---|---|---|---|
| CN | 1150738 A | 8/1996 | ............ H04N 7/24 |
| JP | 06-004996 A | 1/1994 | ........... G11B 20/10 |
| JP | 08-107389 A * | 4/1996 | ............ H04H 1/00 |
| JP | 11-224228 A * | 8/1999 | ........... G06F 13/00 |

OTHER PUBLICATIONS

Hitachi Ltd. (Ito et al.), JP 08-107389 A, "Video Information Toll Charging System," Apr. 23, 1996, Japan Patent Office, Computer Translation into English. Retrieved from the Internet:<URL: http://www.ipdl.jpo.go.jp/homepg_e.ipdl>.*
M. Watanabe et al., JP 11-224228 A, Network Photo Service System,: Aug. 17, 1999, Japan Patent Office, Computer Translation into English. Retrieved from the Internet:<URL: http://www.ipdl.jpo.go.jp/homepg_e.ipdl>.*
1.Japanese Laid-Open Publication No. 11-284973, Oct. 15, 1999.

* cited by examiner

*Primary Examiner*—Justin T. Darrow
(74) *Attorney, Agent, or Firm*—Antonelli, Terry, Stout and Kraus, LLP.

(57) ABSTRACT

The conventional multimedia communication terminals require the implementation of a camera unit for video input and a video encoder for generating encoded video streams. This configuration is expensive and power-consuming, so that the life of battery for driving the transmitter will be short, or otherwise a battery of larger capacity will be required, resulting in a larger size terminal, with less portability. In accordance with the present invention, the video input and encoding process may be implemented in a video information generating apparatus separated apart from the transmitter. The video or audio and video bitstream generated by the video information generating apparatus will be retrieved by the transmitter, or stored once in a server and then forwarded to a receiver.

16 Claims, 18 Drawing Sheets

| | 600 | 601 | 602 | 603 |
|---|---|---|---|---|
| | STREAM ID | NO. OF COPY PROTECTION AVAILABLE | STREAM STORAGE POSITION | EXPIRATION |
| 605 | 0 | 5 | 1000 | 00/6/20 |
| 606 | 1 | 3 | 2000 | 00/9/20 |
| 607 | 2 | 1 | 5000 | 00/4/1 |
| 608 | 3 | 0 | 8000 | 00/5/10 |

VIDEO INFORMATION GENERATING APPARATUS, VIDEO COMMUNICATION TERMINAL, VIDEO DISTRIBUTION SERVER, AND VIDEO INFORMATION SYSTEM

BACKGROUND OF THE INVENTION

1. Field of the Invention

The present invention relates to a video information generating apparatus creating video and audio data, a mobile multimedia terminal sending/receiving video and audio data input to and from the video information generating apparatus, and a system for creating and distributing video data 2. Description of the Prior Art Video data and audio data such as voice and/or music may be transmitted in a compressed form of international standard ISO/IEC 14496 (MPEG-4) at approximately tenth kilobits per second (bps). MPEG-4 may be useful for compressing video and audio signals of a predetermined length to archive thus obtained encoded data into one file or two separated video and audio files to send over networks together with an email data (text strings information). FIG. 1 represents the operation of video and audio file transmission between multimedia terminals, which may send and receive the encoded video and audio file attachments enclosed together with the email data.

FIG. 1 shows a schematic block diagram illustrating the flow of transmission and reception of video and audio files by means of conventional multimedia terminals. A transmitter 1 may send the compressed input video and audio through the transmission line 2 to a distribution server 3 (for example a mail server or the like). The distribution server 3 may receive data, read the destination address of the mail, and transfer the mail through the transmission line 4 to the appropriate receiver 5 of the destination. Otherwise, the distribution server 3 may monitor the establishment of connection thereto from the receiver 5, acknowledge the connection, and then notify thereof the receiver 5 having new mails or transfer the mail through the transmission line 4.

FIG. 2 shows a detailed schematic block diagram of the transmitter 1 shown in FIG. 1. The transmitter 1 may accept character input (for example, keystroke codes) 12, video signals 22, audio signals 32 via a character input device 11, camera unit 21, and microphone 31, respectively. The character input 12 may be encoded by the editor unit 13 to generate character codes 14 to be stored in the area for text streams in a memory 15. The character codes 14 may also be any codes including editing and formatting codes (insertion, deletion, pointer movement, and the like). The video signals 22 may be captured and input to the video encoder 23, which may convert the video signals 22 into the video codes 24, in accordance with the format defined in the MPEG-4. Thus generated video codes 24 may be stored in the memory 15. The audio signals 32 may be encoded to the audio codes 34 in the audio encoder 33 in accordance with the format defined by the MPEG-4 standard, to be stored in the memory 15. Upon instruction of a transmitter user, the transmitter 1 will call the distribution server 3 to establish a connection therebetween. Then the text strings (mail envelope and body of text), video codes, and audio codes stored in the memory 15 will be retrieved from the memory 15 to send to the server through a communication interface 17 and the transmission line 2.

FIG. 3 shows a schematic block diagram illustrating the transmission data on the transmission line 2. The data to be sent will consist of information shown in the figure, from left hand side to right hand side. The destination 50 will be sent first, then the text bitstream 51, audio stream 52, and video stream 53. The text (character) stream may be omitted so as not to send if the audio stream may be used instead. In the following description, however, the text stream and audio stream are both assumed to be sent to the destination receiver.

FIG. 4 is a detailed block diagram of the distribution server 3. The operation of the distribution server 3 may consist of two phases. First of two phases is the reception of data (also referred to as mail data herein below) from the transmitter 1, for storing the data 42 input from the transmitter 1 through a communication interface 41 into the storage buffer 45. In this operation, a charge management unit 43 may be served for recording charge credited to the transmitter to be billed corresponding to the amount of data received at the server, or the duration or the number of times of communication, if necessary. Second phase is the transmission, invoked after the completion of the first phase. In this phase, a communication controller unit 47 may retrieve the mail data 46 stored in the buffer to read the destination. The communication controller 47 may direct a communication interface 49 to call the destination terminal, which may be the receiver 5 in this case. Upon the connection established with the receiver 5 on the transmission line 4, the communication controller may retrieve the text data, audio data, and video data of the mail stored in the storage buffer 45 and send the mail to the receiver 5 through the communication interface 49 and the transmission line 4.

FIG. 5 is a detailed block diagram of a receiver 5. The receiver 5 may establish the transmission line 4 to the receiver 5 using a communication interface 60 upon call from the distribution server 3. Then, the mail data transmitted from the distribution server 3 will be stored in a memory 62 through a communication interface 60. The data stored in the memory 62 at this point of time includes coded text data, encoded audio data, and encoded video data. The user of the receiver 5 may select and read a received mail by using a controller 79 (for example, keystroke input) to display the text data 63 on a display device 66 through the text display processing unit 64. Also the user may retrieve the encoded video 71 and/or encoded audio 75 to decode with a video decoder unit 72 and an audio decoder unit 76 to output the video signal 73 and audio signal 77, and output to the display device 66 and the speaker 78 when required.

Japanese Unexamined Patent Publication No. H11-284973 discloses a technique for transferring and storing data to a host through a communication means when recording a video data. This disclosure may be considered to be as a variation of the foregoing description. The fundamental configuration of a transmitter is identical. Also, the above Japanese Unexamined Patent Publication does disclose nothing about the copy protection and the setting thereof.

The multimedia communication terminals as have been described above of the Prior Art require to implement a camera unit 21 for video input and a video encoder 23 for generating encoded video streams. This configuration is expensive and power-consuming, so that the life of battery for driving the transmitter 1 will be short, or otherwise a battery of larger capacity will be required, resulting in a larger size terminal, with less portability.

SUMMARY OF THE INVENTION

The present invention has been made in view of the above circumstances and has an object to overcome the above problems and to provide a system in which the video capturing and encoding mechanism may be implemented separately apart from the mobile transmitter.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS

First Embodiment

Figure 1:
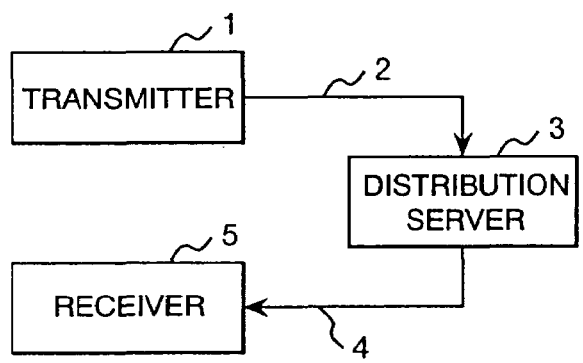
FIG. 1 shows a constitutional diagram illustrating the conventional multimedia terminals.
Figure 2:
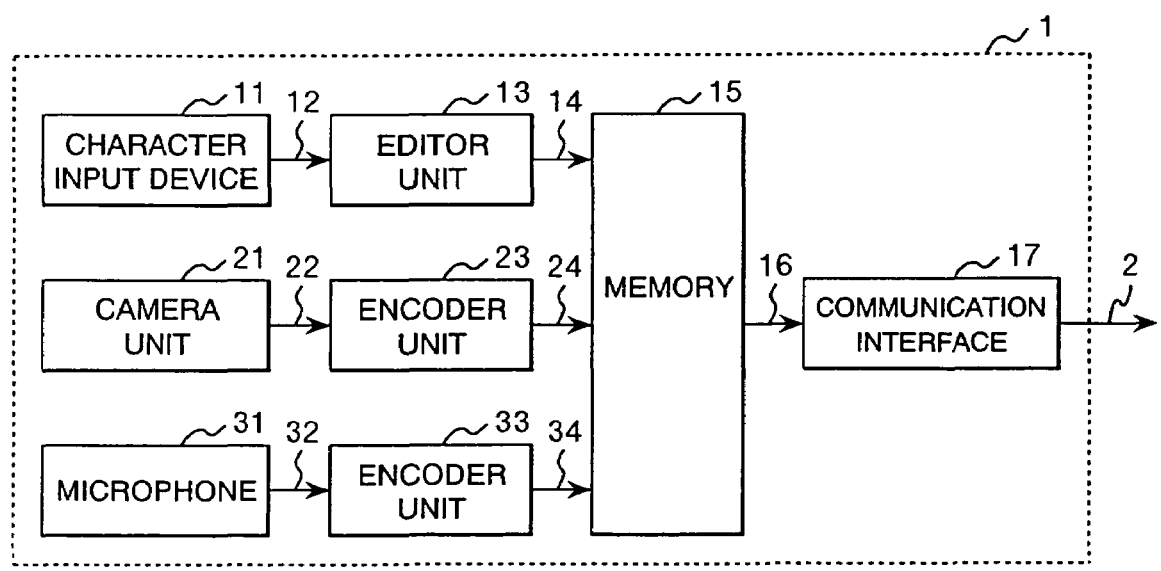
FIG. 2 shows a constitutional diagram of the transmitter shown in FIG. 1.
Figure 3:
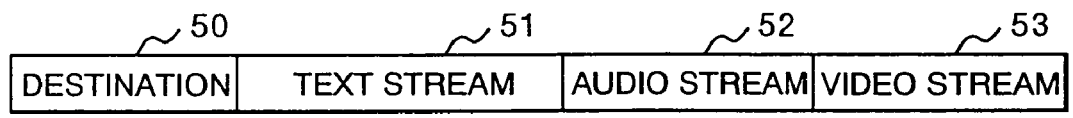
FIG. 3 shows a schematic block diagram illustrating the transmission data shown in FIG. 1.
Figure 4:
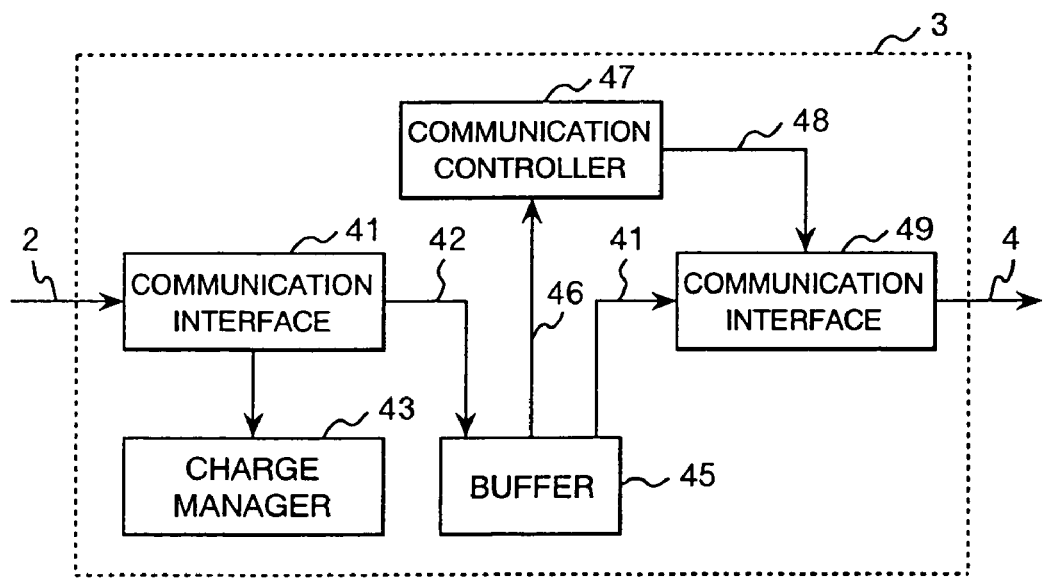
FIG. 4 shows a constitutional diagram of the distribution server.

First preferred embodiment of the present invention will be now described in greater details below with reference in particular to FIG. 6.

A user who wishes to send video and audio data may connect his/her own transmitter 110 to a video information generating apparatus 100. The video information generating apparatus 100 will capture video data and the accompanying audio data 10, encode data to send to the transmitter 110. The user may receive encoded video and audio streams 101 in the transmitter 110, append the destination and text strings (email text) thereto, and send data to a distribution server 120. The transmitter may include among others a portable cellular phone, a handheld computer and the like. The distribution server will read the received destination and forward the text stream with video and audio streams attached to the appropriate destination, a receiver 5.

In the description of the present invention, terminals are referred to as transmitter and receiver according to the primary function for the purpose of simplifying the description. However, the terminals in practice may be one that can be served for both transmission and reception. A transmitter does mean it can send as well as receive data. Similarly, a receiver does mean it can receive as well as send data. A terminal that can handle images and audio-video information may be referred to as video communication terminal, which includes a transmission-only terminal, a reception-only terminal, and a terminal served for both sending and receiving functions.

Figure 6:
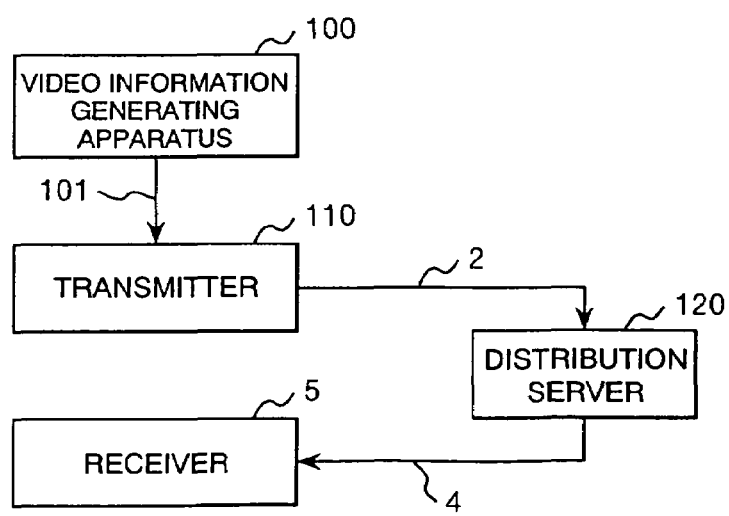
FIG. 6 shows a constitutional diagram of a multimedia data communication in accordance with the present invention.
Figure 7:
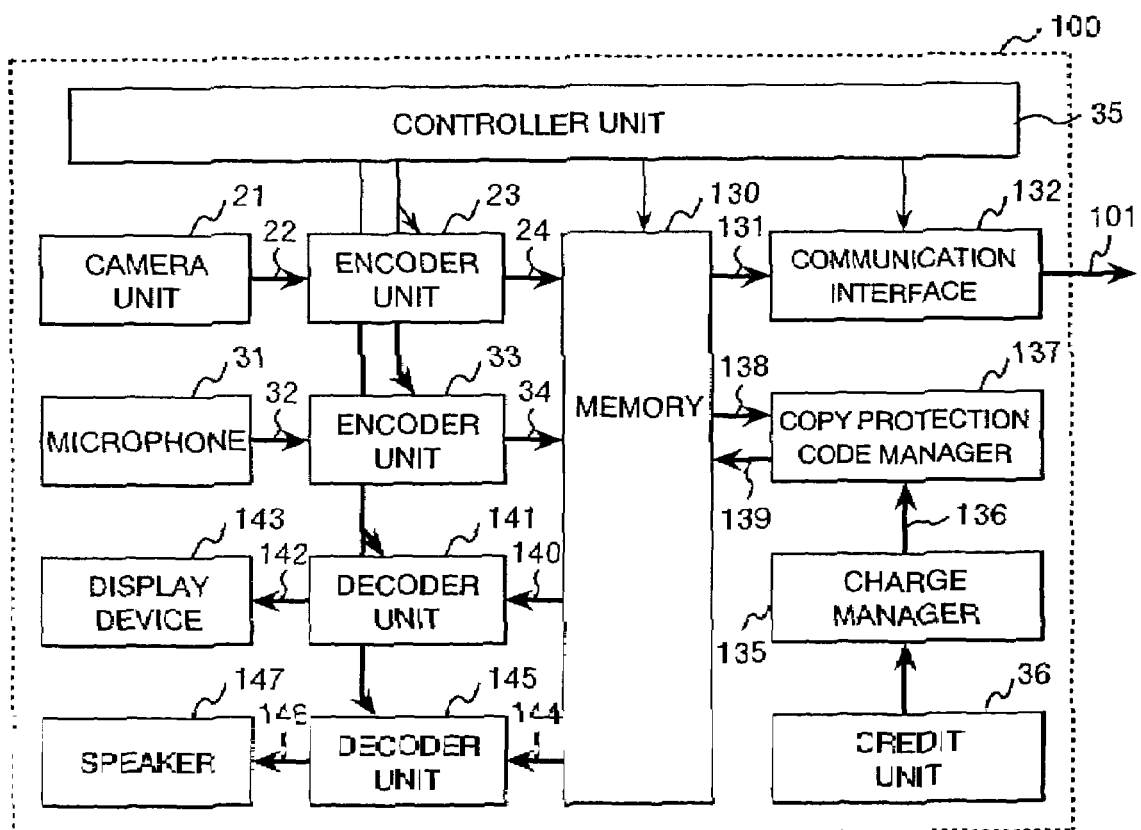
FIG. 7 shows a constitutional diagram of a video information generating apparatus shown in FIG. 6.

FIG. 7 shows a detailed block diagram of a video information generating apparatus 100 shown in FIG. 6. A camera, video capturing device, captures video. The video data input from the camera and the voice (audio) data input from a microphone will be encoded, in a manner similar to the transmitter 1, to the video codes 24 and the audio codes 34 respectively to be stored in a memory 130. The bitstream codes 24 and 34 may be decoded by a video decoder 141 and audio decoder 145 respectively to video stream 140 and audio stream 144 to be played back on a display device 143 and a speaker 147 in order to confirm the contents. At this point of time, a predetermined fee will be paid from a credit manager 136 to the video information generating apparatus 100. Otherwise, a charge manager 135 may notify the copy protection code manager 137 of the copy protection code 136 of the video codes 24 and audio codes 34. The relationship between the fee and copy limit may be predetermined such that five copies cost 300 yen, ten copies cost 500 yen, and so on. Or one single fee covering any number of copies may be allowed. The copy protection code manager 137 will retrieve the video codes 24 and audio codes 34 from a memory 130 through the link 38 to update the copy protection code in a predetermined copy protection code management field of the streamed data, to write back thus updated audio-video code 139 with the copy protection code into the memory 130. Then, the audio-video stream with copy protection information 101 will be read out from the memory 130 through a communication interface 132 to the transmitter 110. A controller unit 35, in response to the operation triggering the video and audio recording by the user of the video information generating apparatus 100, may direct the video encoder 23 and audio encoder 33 to start operating and stop in a predetermined period of time (for example, 5 to 20 seconds). The controller unit 35 also directs the video decoder 141 and audio decoder 145 to start playing back of the video and audio in response to the operation by the user. The controller unit 35 may also respond to the operation by the user to invoke the communication interface 132 to transfer the audio-video stream with copy protection information 101 to the transmitter 110.

Figure 8:
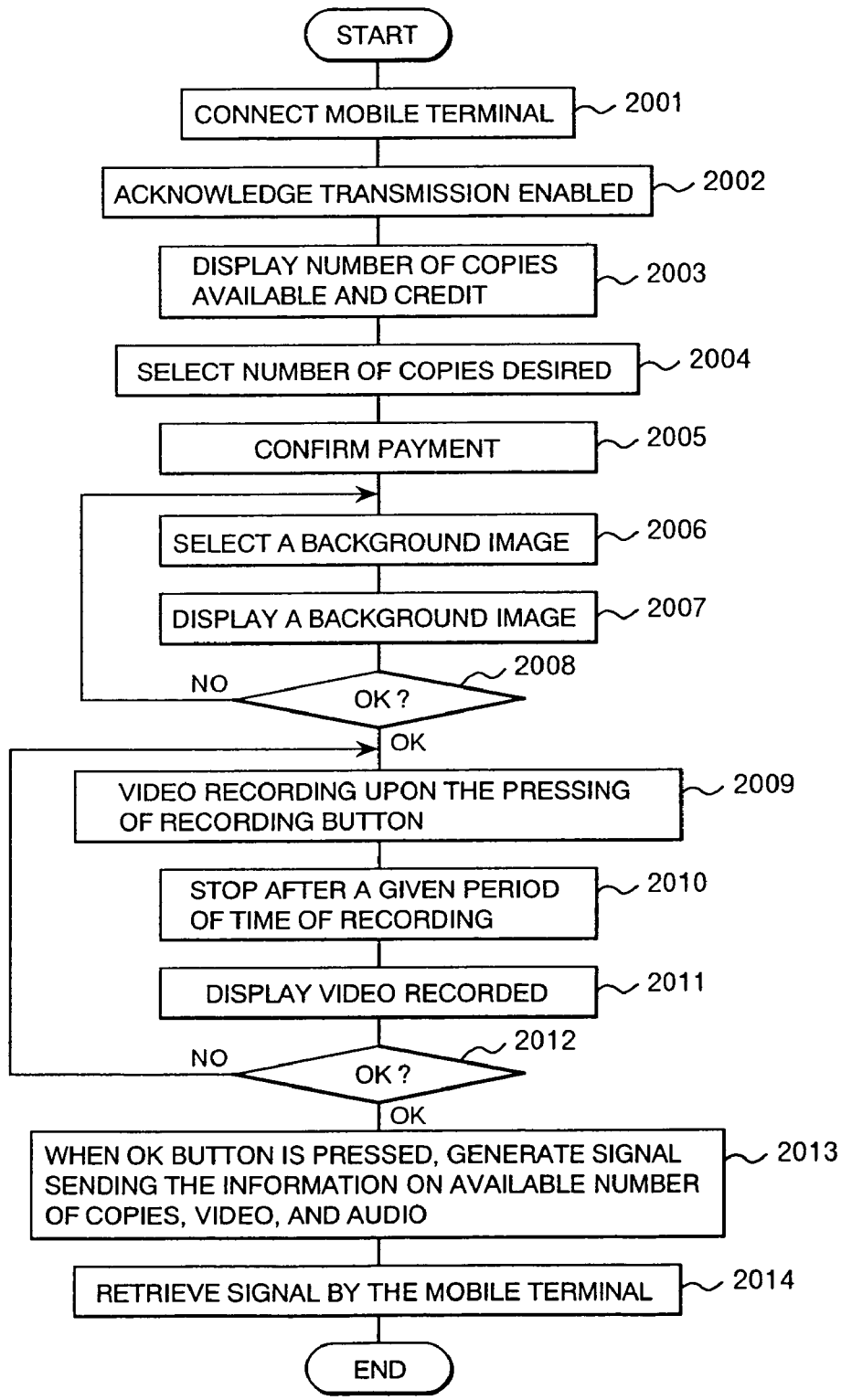
FIG. 8 shows an exemplary flow of operation in the video information generating apparatus.

Now referring to FIG. 8 an exemplary flow of operation in the video information generating apparatus. This exemplary flow is a typical operation including part of modified version as described later, by way of example. First, a user connects his/her mobile terminal, which may be served as a transmitter to the communication interface 132 (step 2001). The communication interface 132 will confirm whether or not the transmission of information to that mobile terminal is allowed (step 2002). Then the number of available copies of the copy protection code and the corresponding charge will be displayed on the terminal under the control of the controller unit 35 along with the information stored in the memory 130 (step 2003). These items may be displayed anytime prior to the establishment of connection of the mobile terminal. The user will select the desired number of copies by for example touching the touch-screen with a finger or pressing a key (step 2004). Then the user will deposit the amount displayed on the screen to the credit manager 36 (step 2005). At this time the screen on the display device will be changed to another screen for selecting a background video. The user may select desired one of background videos by watching the videos (step 2006). Thus selected background video will be displayed immediately on the display device (step 2007). The display of background video may not be necessarily required. If the background video step is omitted then the step will proceed immediately to video capture. If the user desires another background video, the process may go back to the step 2006. If on the other hand the user has no more change, then the capturing may be started by instructing, for example pressing the recording button and the like. As an example, the figure and message of the user may be recorded at this time. The recording may be then started (step 2009).

The video recording will be terminated after a predetermined period of time of recording (step 2010). The recorded video will be then played back to allow the user to confirm the video clip as the user desired. If the recording is not good and the user enters his/her decision, the process will go back to step 2009. If the user enters 'OK', the number of protected copies predetermined by the credit deposited by the user and encoded video and audio codes will be generated (step 2013). These codes will be transmitted to the mobile terminal through the communication interface 132 (step 2014).

It should be understood that although not mentioned in the foregoing discussion, a background music may be recorded at the same time to the video recording.

Figure 9:
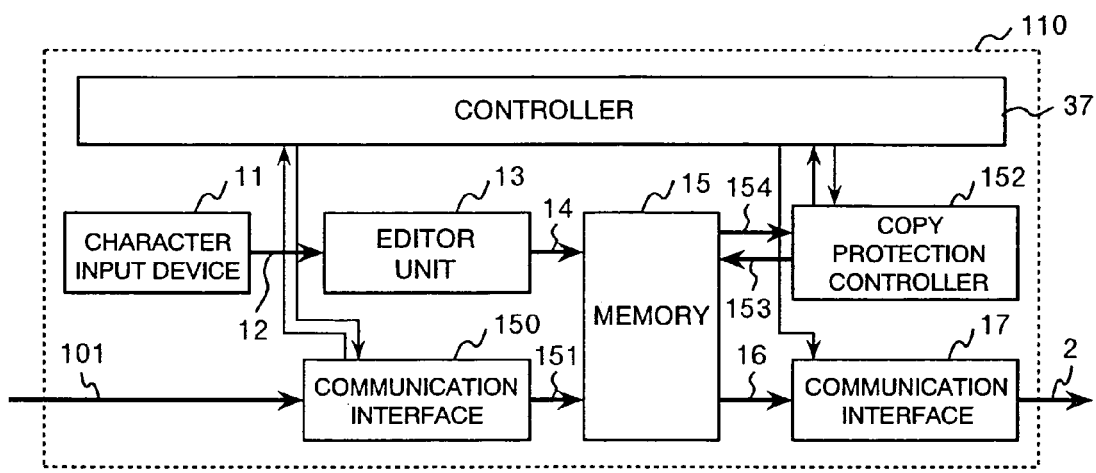
FIG. 9 shows a constitutional diagram of a transmitter shown in FIG. 6.

Now referring to FIG. 9, there is shown a detailed block diagram of a transmitter 110. The transmitter 110 may receive and store the audio-video stream with copy protection information into the memory 15 through the video information generating apparatus 100, transmission line 101, a communication interface 150. Text information 14, if any, may be entered from the character input device 11 through the editor unit 13 into the memory 15, prior to or subsequent to the storage process of audio-video stream. When transmitting the text 14 and audio-video stream with copy protection information 101 to a receiving terminal, the copy protection code controller 152 will retrieve the copy protection code management field from within the audio-video stream with copy protection information to determine the number of copies available. If the number is one or more, then the number will be decremented by one and written back to the copy protection code management field. Thereafter the video stream with copy protection information will be copied into the memory 15 to prepare a transmission video data having the code in the copy protection code management field set to a status indicating 'copy not allowed'. When done, the destination, text data, encoded video transmission data, and encoded audio transmission data will be sent to the distribution server through the communication interface 17.

The controller 37 may perform following operation for the above-mentioned process. The controller confirms the received data with respect to the communication interface 150 and instructs to store data in the memory 15. With respect to the copy protection code controller 152 and the communication interface 17, the controller queries and obtains the remaining number of available copies. If the remaining number is not 0 the controller allows the communication interface to transmit data, if the number is 0 then the controller suppresses the communication through the communication interface.

Figure 10:
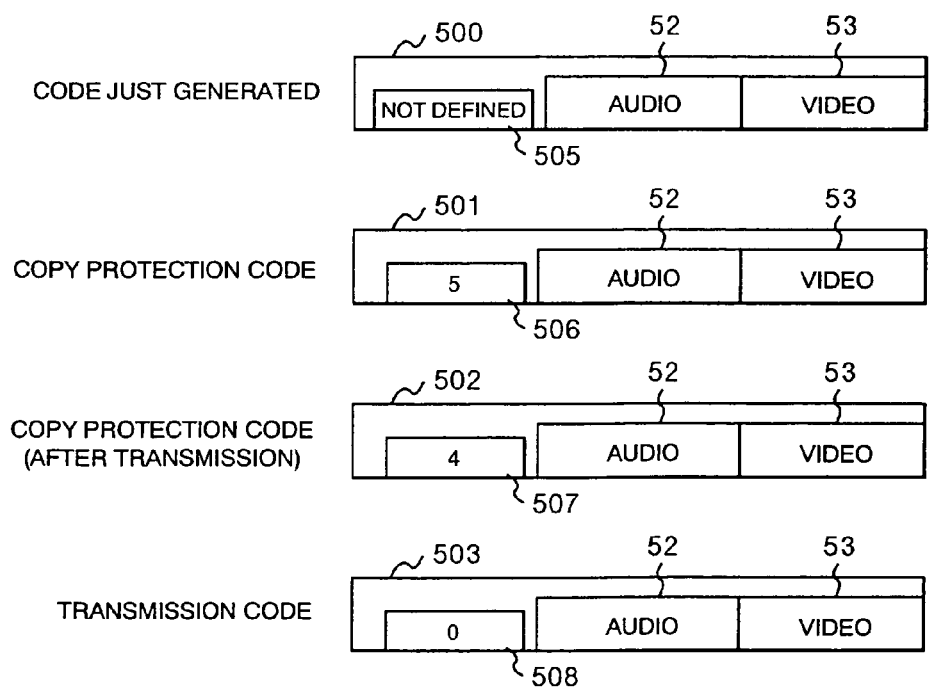
FIG. 10 shows a schematic diagram illustrating some typical examples of encoded audio data and encoded video data.

FIG. 10 is a schematic diagram illustrating some typical examples of copy protection management code shown in FIG. 7 and FIG. 9. In FIG. 10, the topmost is a status of code output from the video encoder 23 and the audio encoder 33 of FIG. 7 immediately after the code is written into the memory 130. The video stream 53 and audio stream 52 are multiplexed to an audio-video code 500, which incorporates a field 501 for indicating the copy protection code. At this point of time the number available of protected copies is not defined. The number may be predetermined instead of being undefined. Once the number available of copies is determined by the confirmation of payment, the audio-video code 500 will be read out from the memory to write a value corresponding to the amount paid (five, in the example shown in FIG. 10) into the field of available number of copies, and then write back to the memory 130. The value of the copy protection code management field indicates the number available for a transmitter to copy and send the appropriate stream. If the number becomes 0, then the data may be played back on the same terminal, however the transmission to another terminal will not be allowed. Then, the audio-video code 501 will be transferred to the transmitter 110 to store in the memory 15. When the transmitter 110 transmits the audio-video code to the receiver 5, the audio-video code stored in the memory 15 will have the remaining number of available copies in the field 507 decremented to 4, as shown by the stream of reference numeral 502. Furthermore the remaining number of available copies 508 of thus copied audio-visual data 504 will be set to 0 (i.e., copy not allowed). At this point, tampering copy protection code may be prevented by adding a check field with the value uniquely determined from the actual copy protection code (such as a parity bit) and by encrypting these values in the copy protection code management field.

More specifically, when an inspector may decrypt the appropriate field if the value in the check field is matched with the check value determined from the actual copy protection code, then no modification has been made thereto. Here an inspector function may be implemented in either of transmitter, receiver, or distribution server.

Second Embodiment

Figure 11:
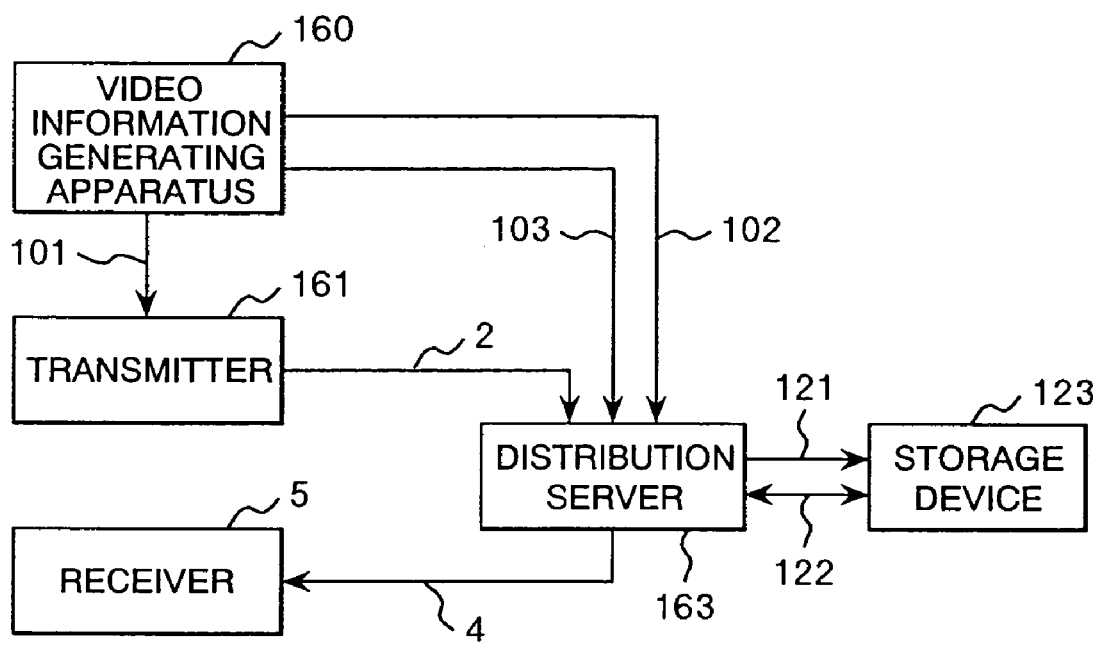
FIG. 11 shows a second preferred embodiment of a multimedia data communication in accordance with the present invention.
Figure 12:
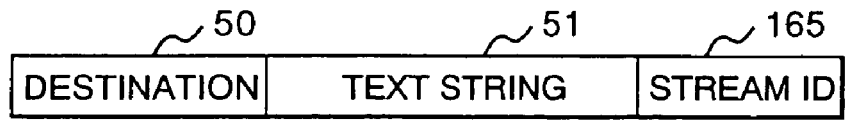
FIG. 12 shows a schematic diagram of output code of the transmitter shown in FIG. 11.

Now referring to FIG. 11, there is shown another preferred embodiment of the present invention. This second preferred embodiment is different from the first preferred embodiment of the present invention in that it does transmit the encoded audio-video stream to a distribution server 163 through a link 102 to store in a storage device 123 attached to the distribution server 163, rather than transmit to the transmitting terminal. The transmitter 161 will instead receive only the ID (identification number) of the encoded audio-video stream from a video information generating apparatus 160. When the transmitter 161 sends the audio-video stream to the receiver 5, as shown in FIG. 12, the destination 50, body of text (mail) bitstream 51 in addition to the encoded audio-video stream ID 165 will be sent to the distribution server 163, which server in turn will retrieve the appropriate encoded audio-visual stream corresponding to the encoded audio-video stream ID 165 from within the storage device 123 to send to the receiver 5 the code attached to the destination 50 and the body of text bitstream 51.

Figure 13:
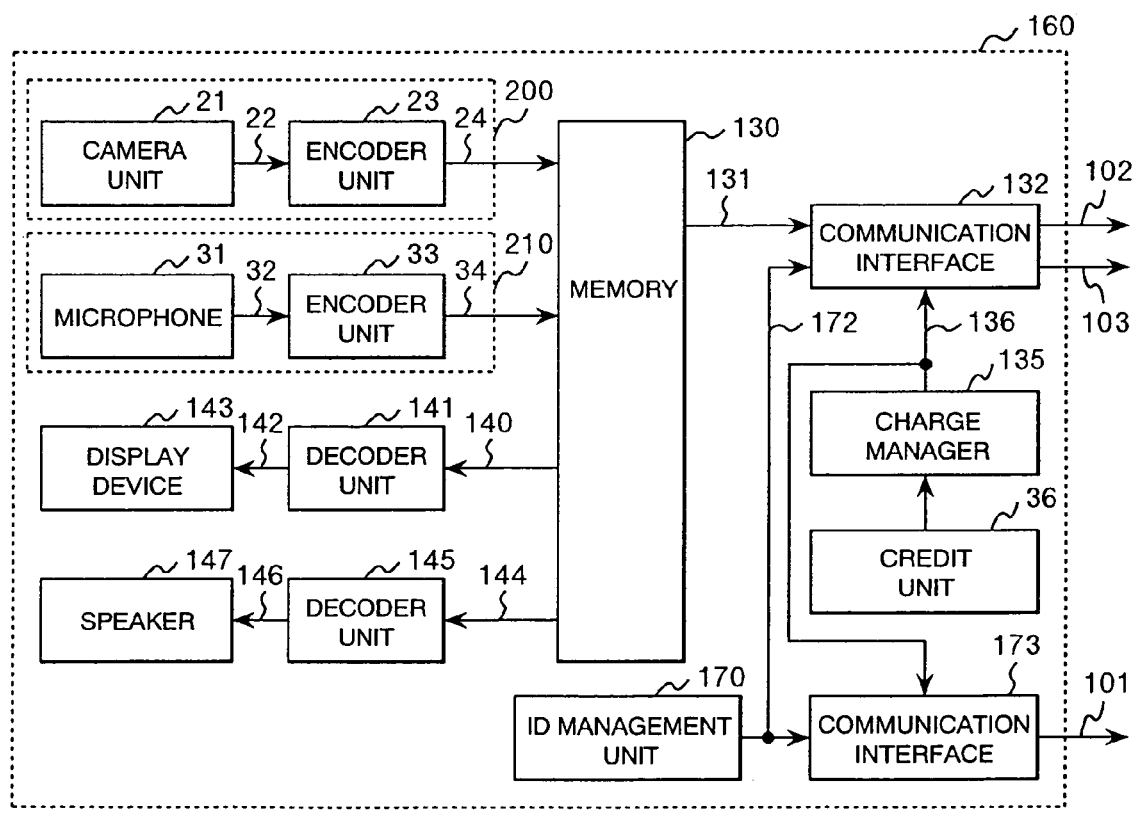
FIG. 13 shows a constitution diagram of a video information generating apparatus shown in FIG. 11.

Now referring to FIG. 13, there is shown a detailed block diagram of a video information generating apparatus 160. The blocks at the left hand side from the memory 130 in the figure, namely the encoding and decoding of video and audio may be identical to the video information generating apparatus 100 shown in FIG. 7. Generated audio and video code will be stored in the memory 130. At this point the copy protection code management field shown in FIG. 10 may or may not be present. The ID management unit 170 will generate a unique ID 172 for each of encoded audio and video bitstreams stored in the memory. The charge manager 135 determines the number available of copies 136 corresponding to the amount that is already collected by the credit manager 36 or that will be positively collected from the user who has created the audio-video bitstream. The number will be multiplexed by the communication interface 132 with the encoded audio-video stream ID 172 to send to the distribution server as the audio-video code ID 103. Simultaneously or later, the audio-video code 131 will be retrieved from the memory to send to the distribution server as the encoded audio-video bitstream 102. On the other hand, the encoded audio-video stream ID 172 and the remaining number of available copies 136 will be multiplexed in the communication interface 173 to send to the transmitter 161 as the audio-video code ID 101.

Figure 14:
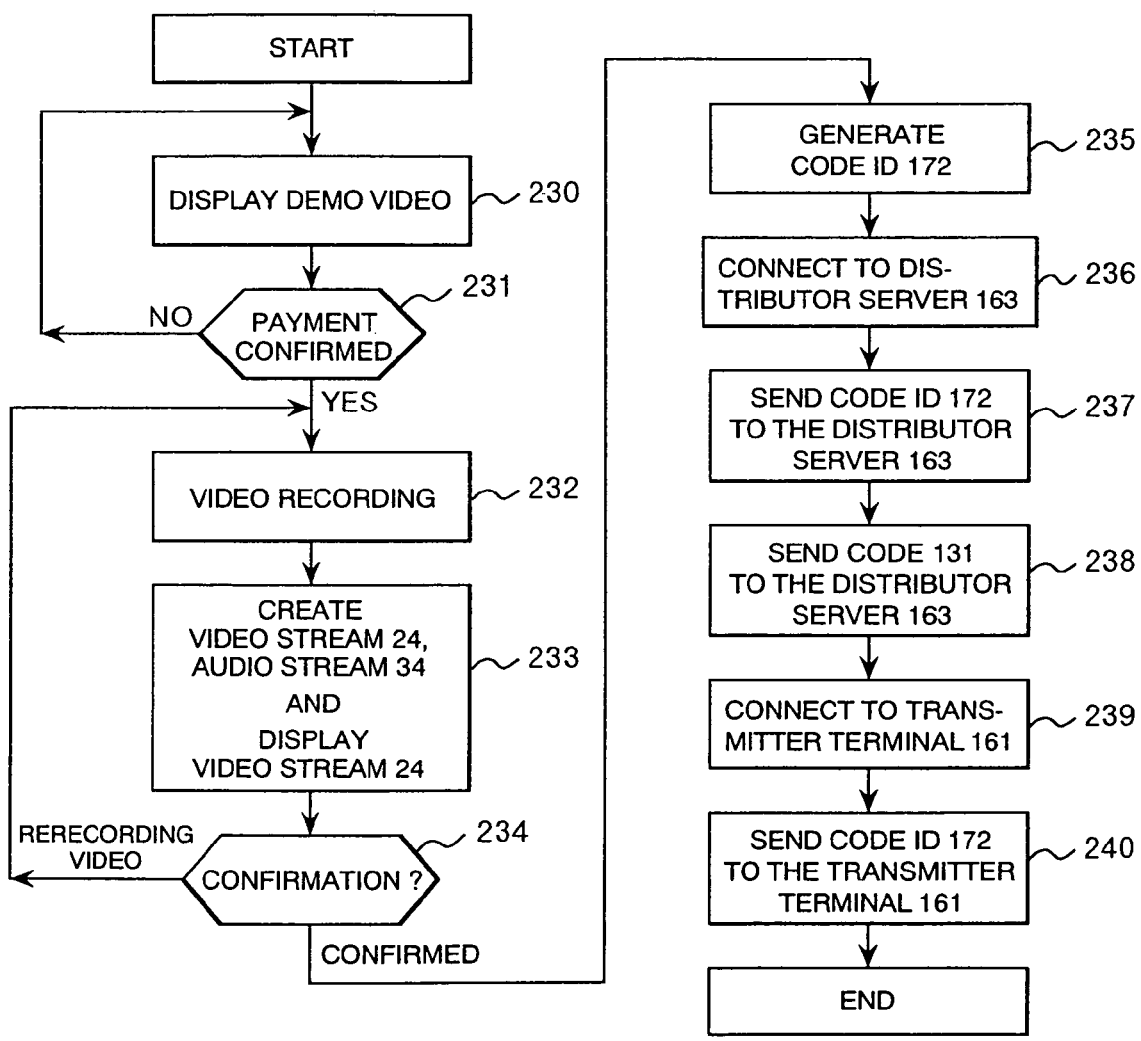
FIG. 14 shows a flow chart illustrating a typical example of the video information generating apparatus shown in FIG. 11.

FIG. 14 shows a flow chart illustrating a typical example of operation viewed from the viewpoint of video information generating apparatus in accordance with the present invention. In default, the video information generating apparatus may display a demonstration video on the display device 143 or display a live video as is captured by the camera unit 21 (process step 230). In this state, the charge manager 135 may monitor whether a predetermined fee is paid from a user or not (step 231) while waiting for the predetermined fee paid by the user. At the time when the user has paid the fee, the process proceeds to process step 232 to allow recording of subject by the camera unit 21 so as to create an audio-video stream (step 233). Then the system asks the user whether or not the user really desires to purchase the recorded video (step 234). If the user acknowledges the purchase of recording, the process proceeds to process step 235, otherwise back to process step 232 to repeat recording. In step 235, an audio-video code ID 172 will be generated. A communication link will be established to the distribution server 163 (step 236). As have been described above description the audio-video stream ID 172 and the audio-video code 131 will be sent to the distribution server 163 (step 237 and 238). Thereafter the established communication link with the distribution server 163 will be disconnected. Then, the system attempts to establish a connection with the transmitter 161 to transmit signal 101 including the encoded audio-video stream ID 172 merged with the copy protection code.

Figures 15, 16:
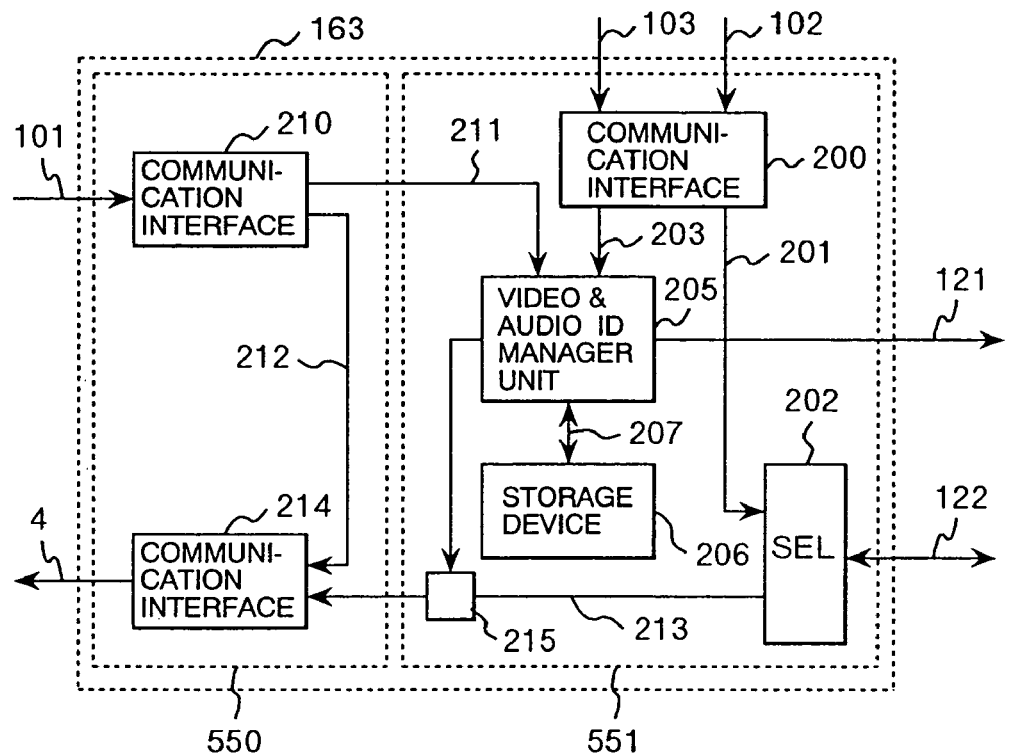
FIG. 15 shows a constitutional diagram of the distribution server shown in FIG. 11.
FIG. 16 shows an example of data structure in the storage device shown in FIG. 15.

FIG. 15 shows a detailed block diagram of the distribution server 163. The operation of the distribution server 163 consists of two phases. First is the communication with the video information generating apparatus 160, second the communication with the transmitter 161. The first phase with respect to a given encoded audio-video stream will be performed always prior to the second, and the second may be iteratively repeated for a plurality of times.

In the first phase the audio-video code ID 103 and the audio-video code 102 will be received from the video information generating apparatus 160 through a communication interface 200. The audio-video stream ID 103 having received will be transferred to an audio-video stream ID manager 205, which manager in turn will extract an ID and the number available of copy protection from the received audio-video stream ID to store in a predetermined space in a storage device 206. In parallel the location information of the audio-video stream to be stored in the storage device 123 corresponding to the appropriate ID in the storage device 206 will be generated to store in the storage device 206. The information on storing location of the audio-video stream will be passed to the storage device 123 as the storage location information 121 while at the same time the input audio-video stream 102 will be output to the link 122 through the link 201 and the selector 202. In the storage device 123 the audio-video stream appeared on the link 122 will be stored at the location identified by the storage location information 121.

Prior to explaining second phase, an exemplary data structure of the management table for audio-video stream ID stored in the storage device 206 is shown in FIG. 16. The storage device 206 has a table structure inside in it as shown in FIG. 16, each video and audio encoded stream ID 600 has its copy protection code 601 and video and audio stream storage location 602 recorded in the table. By storing the expiration data 603 of ID along therewith, unlimited increase of the amount of data in the storage device 206 will be prevented. For example, for a stream ID numbered 0, as shown in the row 605 in the figure, the available protected copy limit is 5, data is stored in the location 1000, expiration 00/06/20. When the copy protection code reaches to zero as the code IF 3 of the row 608, the audio-video stream will be prohibited to transmit. This means that under the control of the audio-video stream ID manager 205 the copy protection code in the management table in the storage device 206 for each ID is maintained such that the copy protection code will be decremented by one for one transfer and the transmission of the stream having a copy protection code reached to zero will be prohibited by controlling a gate 215.

Now turning back to the operation of distribution server 163. In the second phase of operation of the distribution server 163, the audio-video encoded stream ID 211 along with the destination and body of text 212 will be transferred from the transmitter 161 through the communication interface 210. The audio-video stream ID 211 will be then passed to the audio-video stream ID manager 205, which manager in turn will search and retrieve the ID corresponding to the audio-video stream ID from within the data stored in the storage device 206 to obtain the storage location information of that audio-video stream. Then the storage location information 121 will be output to the storage device 123 to read out the audio-video encoded stream stored in the storage device 123. Thus retrieved storage device 123 will then be passed through a selector 202 to become an audio-video stream 213, which will be transferred through a communication interface 214 to the receiver 5 together with the body of text 212.

Figure 17:
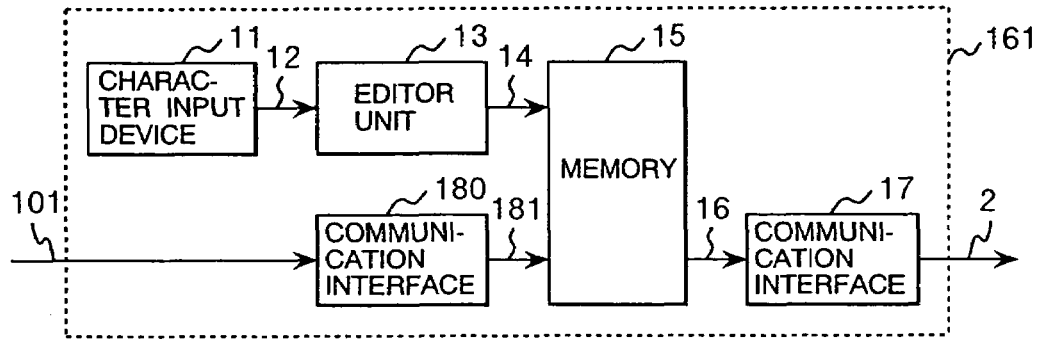
FIG. 17 shows a block diagram of the transmitter shown in FIG. 11.

FIG. 17 shows a detailed block diagram of the transmitter 161. The operation of the transmitter 161 may be consisted of three phases. In the first phase the terminal receives the audio-video stream ID 102 from the video information generating apparatus 160 to store in the memory 15. In the second phase the destination and body of text as well as a flag indicating the presence or absence of added audio and video encoded stream ID will be created by means of the character input device 11 and the editor unit 13. In the third phase the destination and body of text entered from the character input device 11 via the editor unit 13 and the audio-video stream ID received in the first phase and stored in the memory 15 will be transmitted to the distribution server 163 through the communication interface 17. First phase for any one audio-video stream will be performed prior to the second and third phases, and the second prior to the third, while the third may be iteratively repeated for a plurality of times.

Figure 18:
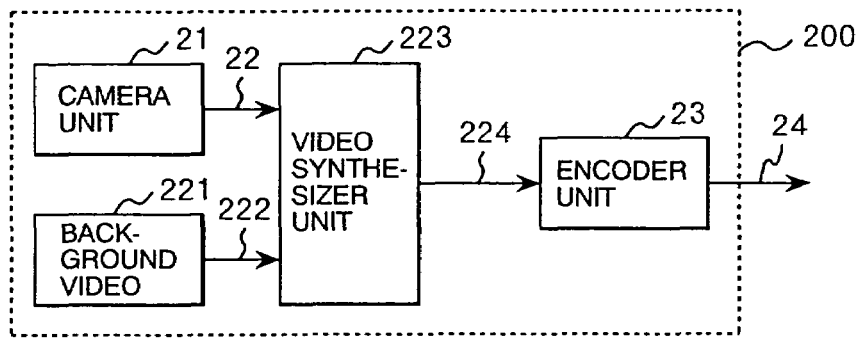
FIG. 18 shows a constitutional diagram of synthesis of background video in the video information generating apparatus.

FIG. 18 shows an exemplary variation of encoding block 200 of the video information generating apparatus 160 shown in FIG. 13. In FIG. 18, the video 22 recorded by means of the camera unit 21 and a background video 222 selected by the user from a group consisted of a series of background videos 221 previously archived are combined at the video synthesizer 223 to create a newly synthesized video 224, then the newly synthesized video 224 will be encoded to generate the video codes 24. The synthesizing procedure may use the chromakey technique, in which a blue wall panel provided for the background of the object to be video recorded with the camera unit 21, and the specific color component (in this case, blue) may be replaced with the background 222 instead of the video signals 22 recorded by the camera, in the synthesizer.

Figure 19:
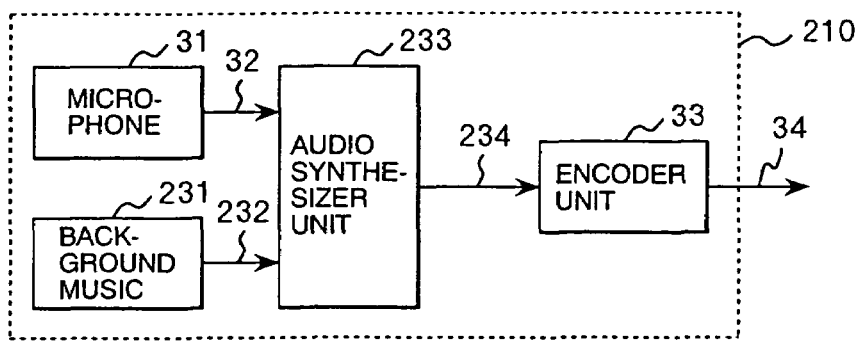
FIG. 19 shows a constitutional diagram of synthesis of audio data in the video information generating apparatus.

FIG. 19 shows an exemplary modified version of the audio encoder 210 of the video information generating apparatus. As similar to the video of FIG. 18, the speech input from the microphone 31 may be synthesized in the audio synthesizer 233 with a background sound 232 selected from a group consisted of a series of background sounds 231 to generate the audio 234 to be encoded to the audio codes 34.

Figure 5:
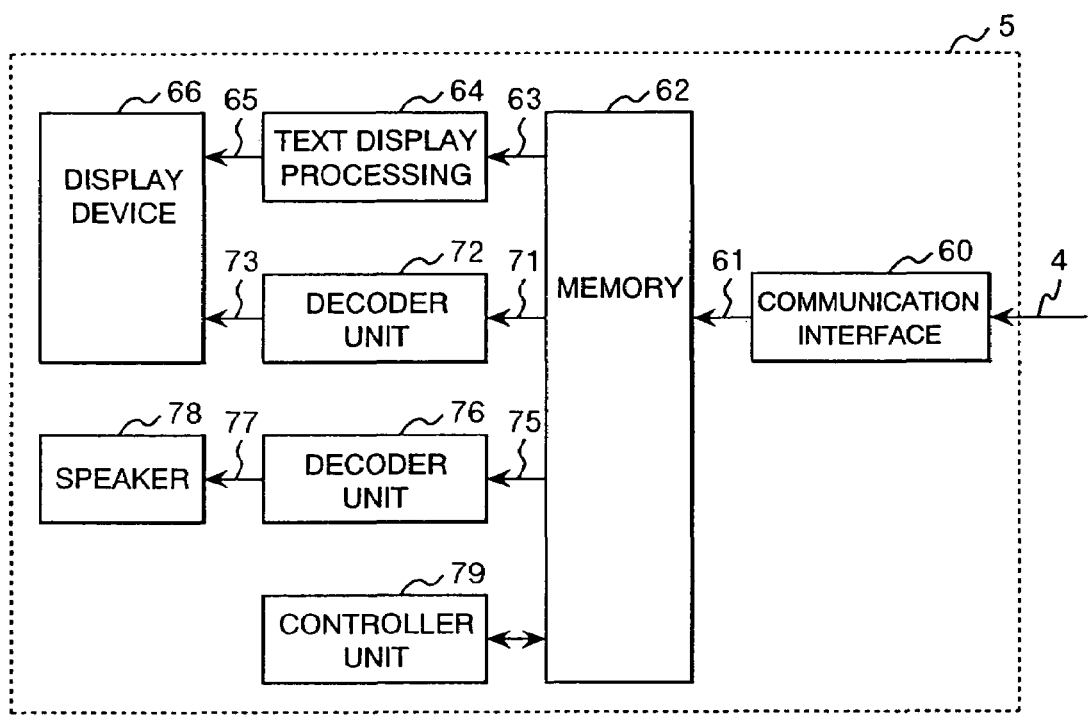
FIG. 5 shows a constitutional diagram of a receiver.
Figure 20:
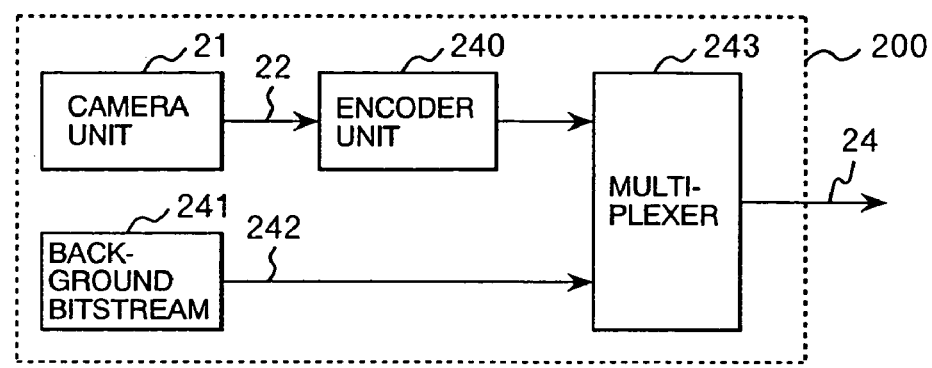
FIG. 20 shows a constitutional diagram of the modified version of background video in the video information generating apparatus.

FIG. 20 shows a second example of the modified version of video encoder block 200 of the video information generating apparatus 160 shown in FIG. 13. In FIG. 20, the video 22 recorded by means of the camera unit 21 will be processed by the video encoder 240 to strip out the background, so as to enable object encoding of the object. The typical object encoding methods may include, among others, the shape coding defined by MPEG-4. Then the encoded object may be multiplexed by the multiplexer 243 with a background code 242 selected from a group consisted of a series of background codes pre-recorded and pre-encoded from background videos to generate the video codes 24 of two objects consisted of background video and the object video. In order to decode the encoded video, the video decoder unit 72 of the receiver 5 shown in FIG. 5 has to incorporate the decoding function of object encoding.

Figure 21:
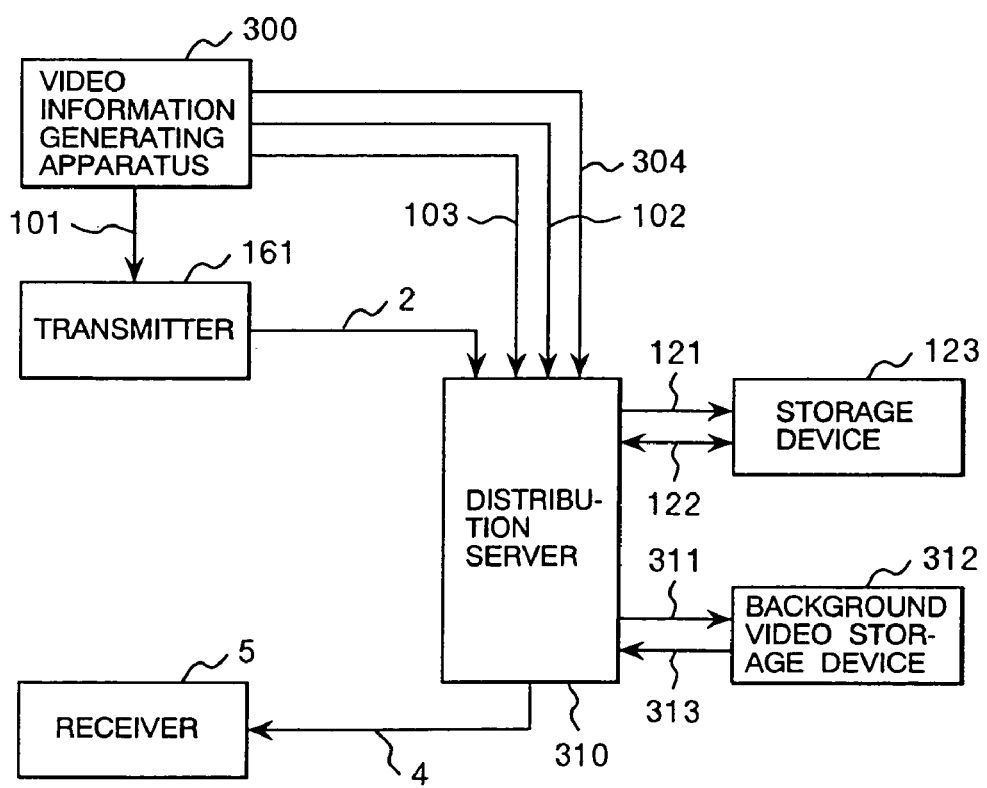
FIG. 21 shows a constitutional diagram of synthesis of a background video and an object video performed in a distribution server.

FIG. 21 shows a representative example of synthesis of a background video and an object video performed in a distribution server 310. The primary difference from the system shown in FIG. 11 is in that the background video selector signal 304 is added, a background storage device 312 is attached to the distribution server 310, the object video (the video code of the audio-video encoded stream 102) and a background video code 313 are synthesized (multiplexed) in the distribution server 310.

Figure 22:
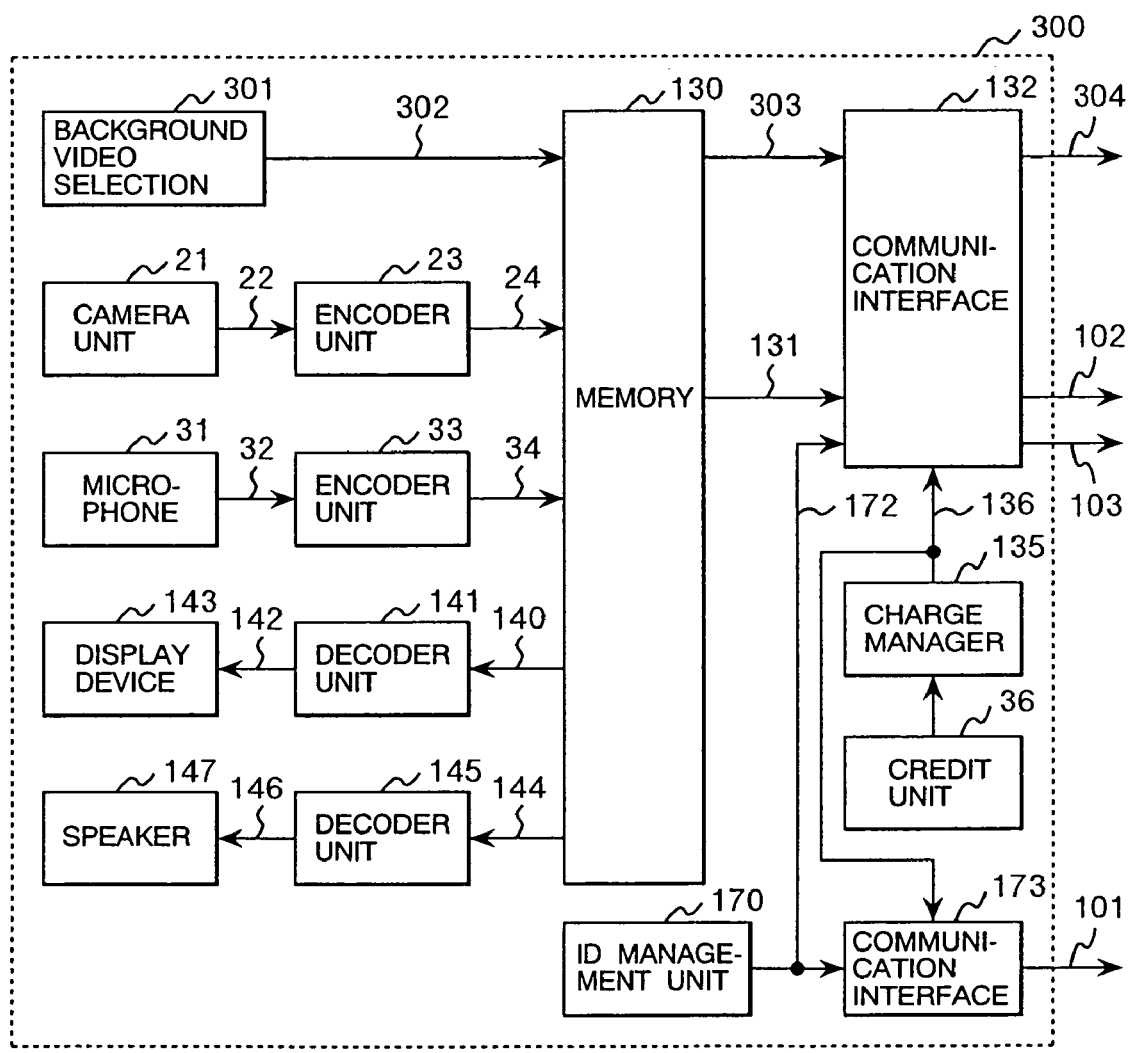
FIG. 22 shows a constitutional diagram of the video information generating apparatus shown in FIG. 21.

FIG. 22 shows a detailed block diagram of the video information generating apparatus 300 shown in FIG. 21. The primary difference from the video information generating apparatus 160 shown in FIG. 13 is in that a background video is selected by a background video selector 301 (background video 302), and that the selection signal will be transmitted to the distribution server to be served for the background video selector signal 304.

Figure 23:
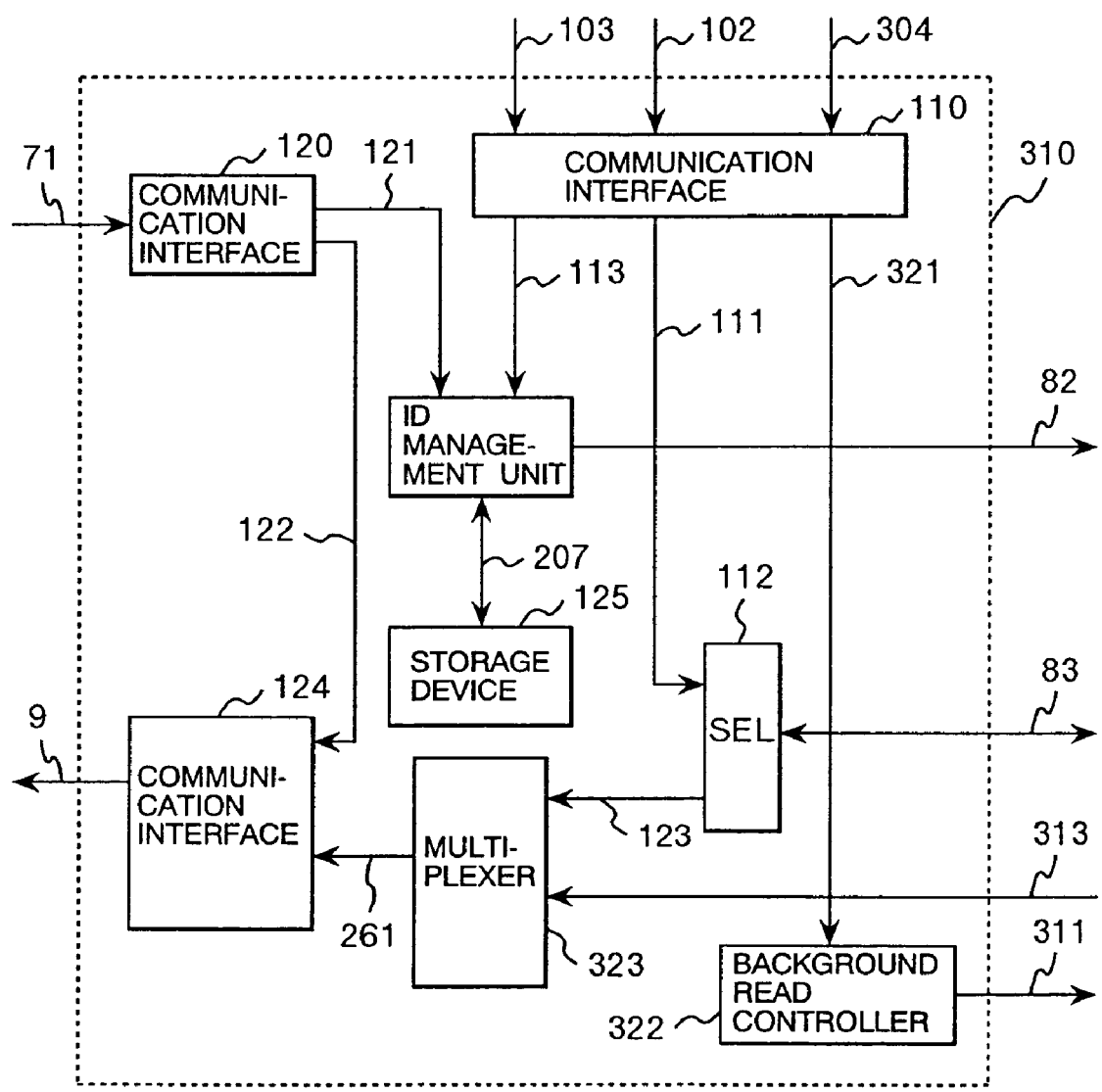
FIG. 23 shows a constitutional diagram of the distribution server having a video synthesis function shown in FIG. 21.

FIG. 23 shows a detailed background of the distribution server 310 shown in FIG. 21. The difference from the distribution server 120 shown in FIG. 15 is in that the receiving function of the background video selector signal 304 is added, that the background video selector signal 321 is used for generating the location information 311 of the appropriate background video in the background read controller 322 to send to the background storage device 312 to retrieve the corresponding background video code 313 stored in the background storage device 312, and that thus read background video code is multiplexed (synthesized) with the video stream 123 of the object (stored in the storage device 123) in the multiplexer 323.

Figure 24:
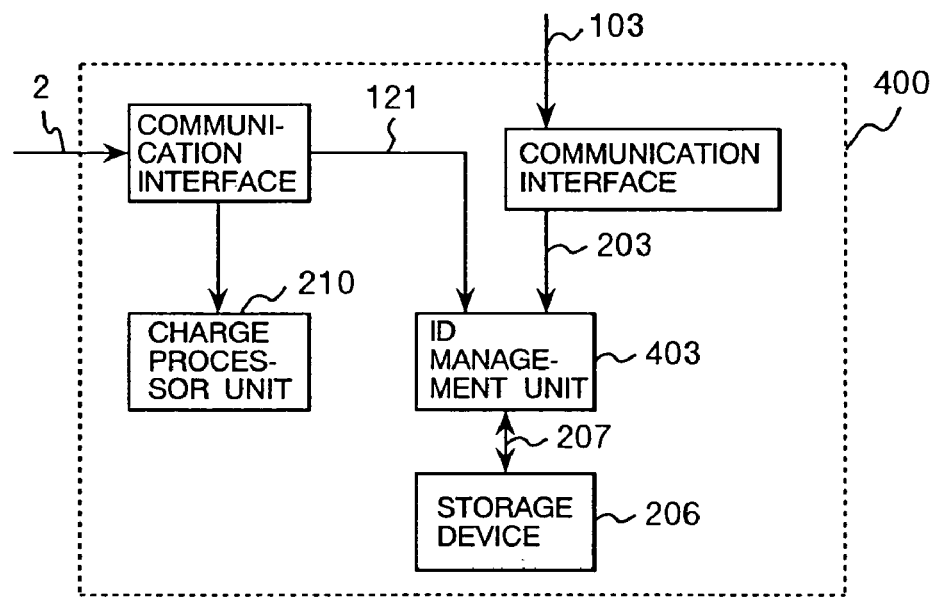
FIG. 24 shows a constitutional diagram of a representative copy protection code management server.

FIG. 24 is a representative copy protection code management server 400 for updating and maintaining the copy protection code of the second preferred embodiment. In the figure two procedures are shown for updating the copy protection code. First method is to transfer the audio and video stream ID and additional copy protection code from the transmitter 161 through the transmission line 2 to the copy protection code management server 400 to collect the appropriate fee by the charge processor 210 in the copy protection code management server 400. Second method is to add a functionality supporting the copy protection code update in the copy protection code update terminal (for example, in the video code generating apparatus) to collect the appropriate fee by the apparatus and to send the audio-video code ID and additional copy protection code update available through the transmission line 103 to the copy protection code management server 400. In either method, the audio-video code ID and additional copy protection code update will be input into the ID manager 403, which will update the copy protection code of the appropriate audio and video stream ID in the storage device 206 storing the table shown in FIG. 15 by the specified code.

Figure 25:
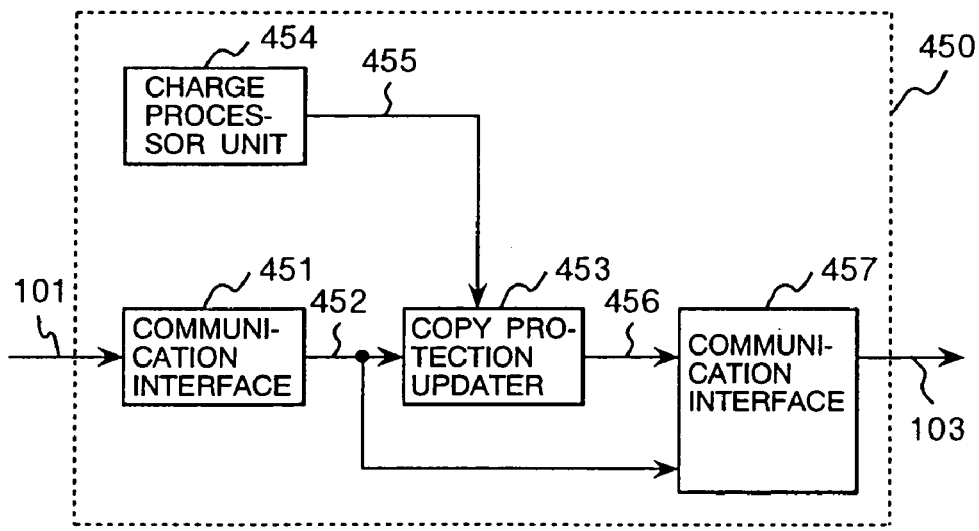
FIG. 25 shows a constitutional diagram of a copy protection code updater.

FIG. 25 shows a detailed block diagram of a copy protection code updater terminal 450 used in the second example shown in FIG. 24. The copy protection code updater terminal 450 may establish a connection to the transmitter 161 through the transmission line 101 to obtain an audio and video stream ID 452. At the same time a charge processor 454 will collect the fee to notify the copy protection code updater 453 of the payment information. The copy protection code updater 453 updates the copy protection code 456 appropriately to the collected amount of fee to inform the copy protection code management server 400 of the copy protection code update 456 and the audio and video encoded stream ID 452 through a communication interface 457 and the transmission line 103.

The following description of modified versions is also in the scope of the present invention.

In FIG. 11 or FIG. 21, the video information generating apparatus 160 or video information generating apparatus 300 have been described which only transfer the audio and video stream ID 101 to the transmitter 161. However the audio and video stream itself may be transferred to the terminal for the purpose of confirmation of the recorded video. To do this the audio and video code transferred to the transmitter 161 will be moved to an area restricting the transfer, apart from the ordinary files and texts to inhibit the transfer to any other terminals.

In the preferred embodiments of the present invention, the video code generating apparatus may collect the fee each time a video is recorded. However in FIG. 11 or FIG. 21, charge request may be passed from the video information generating apparatus to the distribution server to charge the account of appropriate transfer terminal in addition to the communication charge, data communication charge. When the charge has been acknowledged the acknowledgment will be sent back to the video information generating apparatus, which may be served thereafter in a similar manner that the video information generating apparatus itself creates a charge.

The fee for the audio and video recording has been described which may be updated in correspondence with the copy protection code. However, the fee may be defined based on the duration of recording, the screen size of input video, the amount of encoded data, or a combination thereof.

Although the foregoing embodiments have been described in the assumption of the automatic data transfer from the distribution server to a receiver, a receiver may establish a connection to the distribution server to query the distribution server whether data to that terminal is awaiting or not, and to transfer data to the receiver when the data is present in the server, without departing from the spirit and scope of the present invention.

In either embodiments described above of the present invention, the link between the video code generating apparatus and the transmitter or the distribution server, the link between the transmitter and the distribution server, the link between the distribution server and the receiver may be based on the hardwired connection or wireless. Also either a line exchange as well as the packet exchange may be equivalently used. Furthermore, the link between the distribution server and the audio-video synthesizer server in the first and third embodiments as have been described above may be acceptable either a hardwired or wireless communication. Also either a line exchange or packet exchange may be implemented. The distribution server may be implemented in the same apparatus to the audio and video synthesizer server. A wired link between the video information generating apparatus and the transmitters and between the video input terminal and the distribution server allows the transmission of audio and video encoded stream having relatively much data in a reliable, high-speed and cost-effective manner, in comparison with the wireless communication. Because the embodiments shown in FIG. 11 and FIG. 21 do not transmit the audio and video encoded stream between the video information generating apparatus and the transmitter, a hardwired link is not necessarily required, however the wired communication, which allows the positive transmission of product (encoded data), may assure users. The communication link of data between the video information generating apparatus and the transmitter is not necessarily on a communication line. For example, a removable storage device, more specifically any data carriers may be used including nonvolatile memories such as a flash memory and a flash memory-card, floppy diskettes, MD (mini disk), CDR (CD recordable), DVD (digital versatile disk) RAM and the like.

Although the audio and video encoded stream and mail data have been described in the preferred embodiment above, which may be stored in the same memory of a transmitter or receiver, the audio and video encoded stream may be stored in an external storage device of the terminal (such as a removable flash memory, a hard disk drive, or a floppy diskette and the like) since the bitstreams has much larger amount of data than the mail data.

Figure 26:
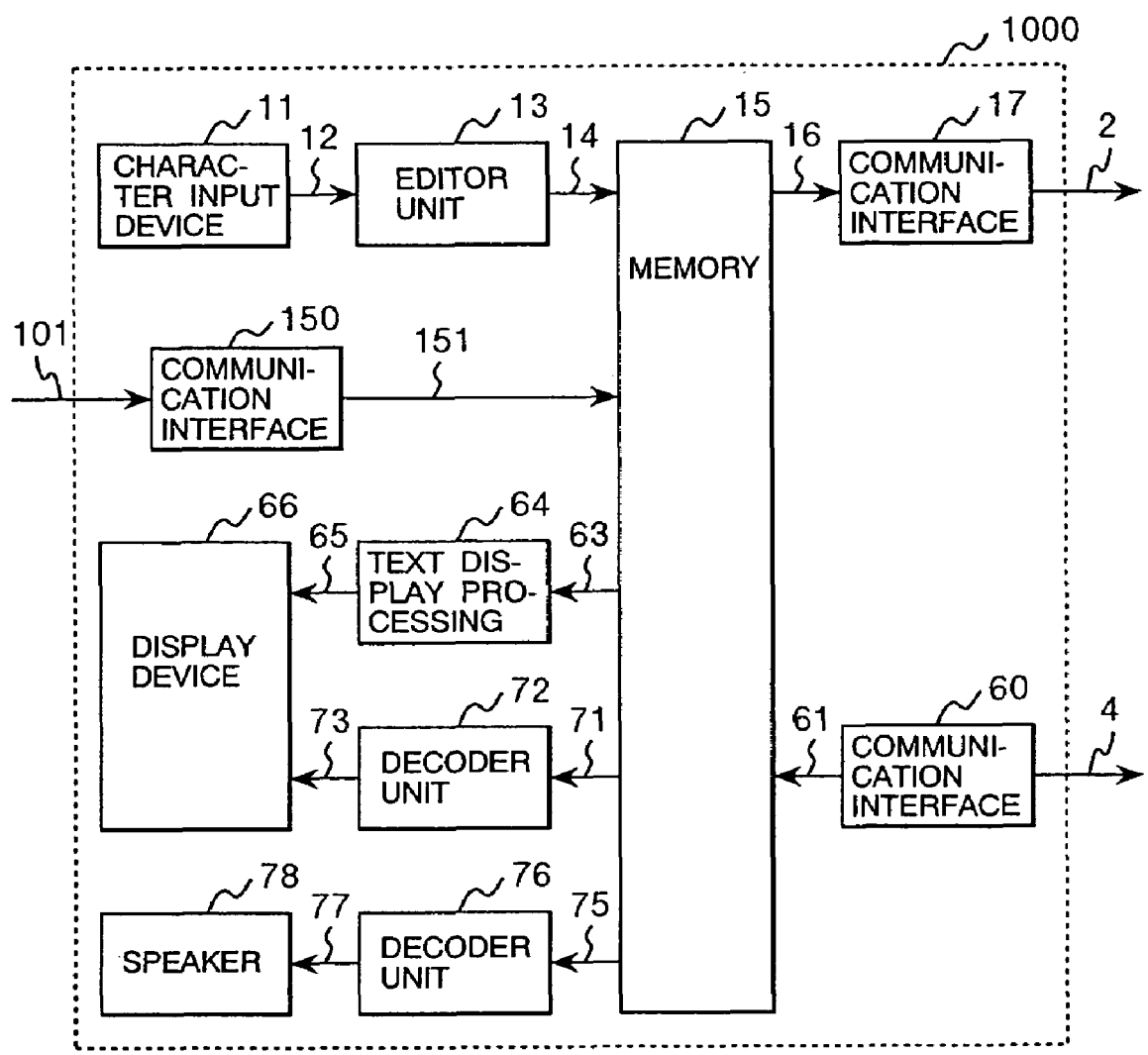
FIG. 26 shows a mobile terminal having both functions of the transmitter of FIG. 9 and the receiver of FIG. 5.
Figure 27:
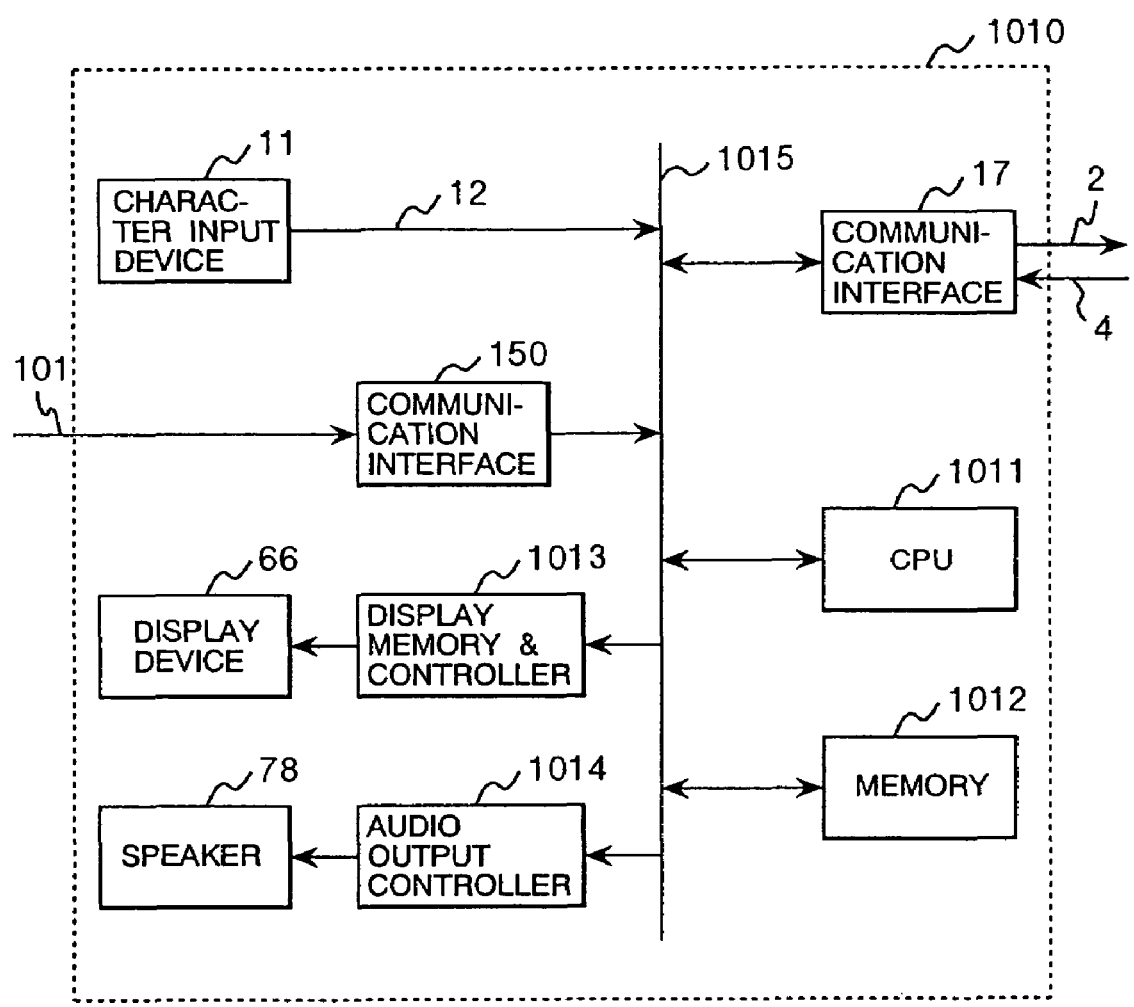
FIG. 27 shows a modified version of transceiver device shown in FIG. 26.

The function of transmitter and that of receiver have been described separately, however as shown in FIG. 26, a mobile terminal having both functions may be used. In this case, the memory 15 may be shared for by both functions. Moreover, the editor unit 13, video decoder unit 72, and the audio decoder unit 76 shown in FIG. 26 may be implemented by software. FIG. 27 shows a transceiver terminal 1010 having the editor unit 13, video decoder unit 72, audio decoder unit 76 implemented by software. The software will be executed by a CPU 1011, the display video or display characters will be output through a display memory 1013, speech or audio output through an audio output 1014. The memory included in a display memory and controller 1013 may be sharable with the main memory 1012. In FIG. 27, the communication interface 17 is shown as one block that includes the functionality of communication interface 17 and communication interface 60. One practical example of the transceiver terminal 1010 shown in FIG. 27 may include, among others, a portable cellular phone.

Figure 28:
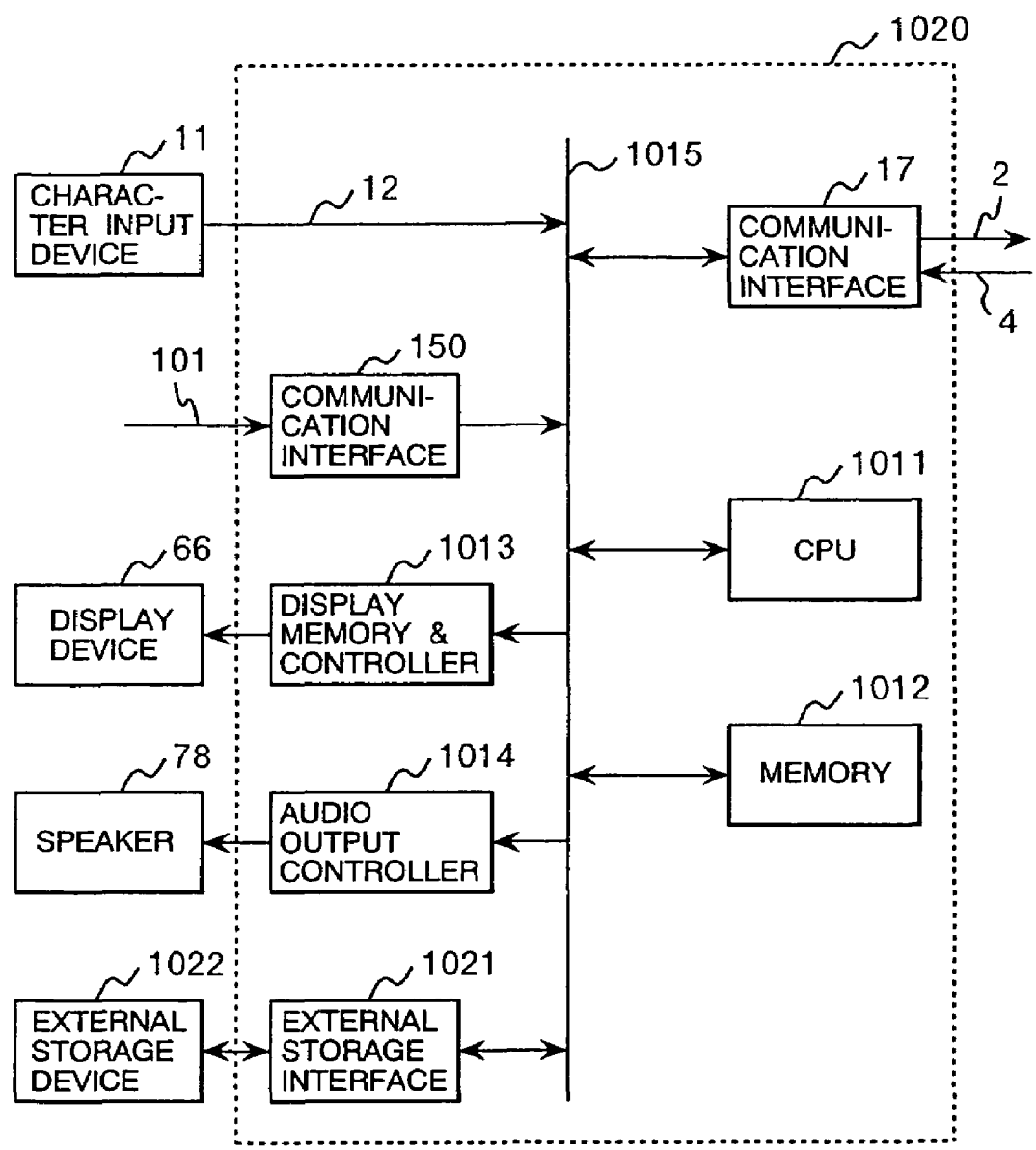
FIG. 28 shows a second modified version of transceiver device shown in FIG. 26.

Another modified version of device shown in FIG. 26 is illustrated in FIG. 28 as a transceiver terminal 1020. The transceiver terminal 1020 has a character input device 11 (for example, a keyboard and a mouse), a display device 66 (for example a monitor display), a speaker 78 attached outside the terminal. In addition, an external storage device 1022 and an external storage interface 1021 controlling the storage device are installed as well. The external storage device 1022 may include a hard disk drive or a flash memory, which may store softwares served for editor unit 13, video decoder unit 72, and audio decoder unit 76, as well as softwares served for communication management, copy protection code management and the like. The external storage device 1022 may be the same device as the removable storage device as have been described above, or may be proprietary. Furthermore, another external storage interface may be installed to the transceiver terminal 1020 to connect both the removable media device and a fixed device (a hard disk drive and the like, which is never hot-swapped). A practical example of the transceiver terminal 1020 of FIG. 28 may include a personal computer, a handheld computer, a personal organizer, a portable information terminal, and the like.

In any preferred embodiments of the present invention, a common transmission procedure may be used in the communication interface using the transmission line 101 (for example, communication interface 150) and the communication interface using either or both the transmission line 2 and transmission line 4 (for example, the communication interface 17).

The distribution server shown in FIG. 15 may be split into two parts consisted of the data communication processor 550 and the audio and video coded stream manager 551. These parts may be located in geologically different locations. Here the data communication processor unit 550 and the audio and video encoded stream manager 551 may be implemented separately. More specifically, the location information (for example, URL) of the code processor unit in addition to the stream ID may be stored in the audio and video encoded stream ID to forward by the communication processor unit to the receiver the audio and video encoded stream ID as part of a mail. The receiver in turn decodes the contents of audio and video encoded stream ID to obtain the appropriate encoded stream by accessing the code processor once again.

Also, the storage device 123, the background storage device 312 may be located in a geologically separate location. The data communication therebetween may be implemented by either a hardwired or wireless connection, and by either a line exchange or a packet exchange.

The audio and video encoded stream ID may be encrypted when passing through the link between the video information generating apparatus and the distribution server or transmitter, or between the transmitter and the distribution server in order to prevent an unauthorized attempt of use of the audio and video stream ID by a third party. If the connection between the video information generating apparatus and the transmitter is implemented as a hardwired communication of face-to-face, data encryption may not be necessarily required. When sending the audio and video stream ID from the transmitter to a distribution server, some codes for unique identification of the transmitter side along with the audio and video encoded stream ID may be added, or the audio and video encoded stream ID may be encrypted by a private key that only the transmitter possesses in order to prevent any unauthorized attacks.

Any preferred embodiments of the present invention may be implemented by hardware, by software, or by a combination thereof. In case of a software-implemented system, the program that manages the copy protection code in the transmitter 110 is assumed to be installed in the terminal by default. The software may also be installed by downloading from either a video input terminal 100, or distribution server 120, or any other connectable server. The receiver 5 in any preferred embodiments of the present invention has been described, which may not copy the received audio and video encoded stream to elsewhere, namely may not forward to any other terminals. However, in order to implement this restriction, either one of following two control functions are required.

First control function may be the implementation of restricting the transmission of received audio and video encoded stream to a third party. To achieve the first control function a specific process including flagging a special bit or storing in a specific storage area when storing the received audio and video encoded stream should be implemented to identify from any other transmittable files or data.

Second control function may be the implementation of the copy protection code management in the receiver in a manner similar to the transmitter. In FIG. 10, the copy protection code is 0 upon reception of audio and video encoded stream, as shown by the reference numeral 503. When a copy protection code management is implemented in the receiver as well, no special process is needed for the received code to be copy-protected. In addition, when the second control function is implemented, an additional functionality may be achieved in which a sender may specify the number of copies allowed. This means that, by writing a value 1 or more in the copy protection code management field (for example, 2) when transmitting, the receiver may forward the received audio and video encoded stream to someone else by the number of times (for example 2) that the transmitter has specified. In such a case the number available of copies after transmission from the sender will be decremented by the value written in the copy protection code management field plus one (in the foregoing example, subtracting 3 from the value before transmission).

When a request of copy protection code update arrived from another terminal different from the one receiving the audio and video encoded stream or audio and video stream ID (the original one) by connecting to the video information generating apparatus, the copy protection code updater terminal 450 shown in FIG. 25 may reject the request. To do this, the copy protection code updater may transmit its own unique ID when connecting, and embed the unique ID of original terminal into the audio and video stream. The copy protection code updater terminal 450 will compare the ID of the connected terminal with the terminal ID embedded in the audio and video encoded stream to confirm the identity. Thereafter the copy protection code update may be allowed.

A given number of copies available may be indicated by embedding a predetermined value in the copy protection code management field of the audio and video encoded stream. The predetermined value may include, for example, −1, and the maximum value expressive in the field.

The communication terminals of the preferred embodiments in accordance with the present invention have been described which may send the audio and video encoded stream added to the body of text. However the body of text is not necessarily required. In other words, the transmission can consist of only the destination and audio and video encoded stream (or audio and video encoded stream ID). A broadband music signal (audio signal) may be input, encoded, and transmitted in place of the voice signal. Also a still image may be used in place of video, without departing from the spirit and scope of the present invention. Furthermore, the present invention may encompass a case in which a body of text may be used including a combination of still images, videos, audio and sound. In the latter case the copy protection indicates the available number of copy of the body of text, by embedding in a predetermined field in the body of text.

The copy protection information may be managed individually for each of media including video, still image, speech, audio, and text. When forwarding (copying) the whole media at once, the minimum value of each copy protection code management field should be confirmed to determine whether copiable or non-copiable. Also, the copy protection code of every copied items should be decremented by one.

Although in the foregoing description the present invention has been described such that a camera is operable when an appropriate fee has been paid and that the video code recorded by the camera is added with the copy protection code having a value corresponding to the amount paid, the camera may be operable by other than the fee. For example, the camera may be operational for a presentation of advertisements to the user. In this case the copy protection code added to the video code may be varied in correspondence with the number, the length the contents of advertisements presented to the user. Otherwise, the user plays a game in advance, and the camera may be operable in accordance with the result of the game. In this case the copy protection code added to the video code may be varied in correspondence with the points obtained in the game by the user.

In the foregoing description, the term 'copy' is defined by transmitting (forwarding) to another terminal via a communication means. However the concept 'copy' may include the data copy in a terminal. For example, as shown in FIG. 28, writing the audio and video encoded stream received from the video information generating apparatus via the communication interface 150 and stored in the memory 1012 into the external storage device 1022 may be defined as a 'copy' and may be encompassed in the scope of the present invention. More specifically, by way of example, when the copy protection code of input code stream contains the value 5, and if the code is copied to the external storage device 1022 once, then the copy protection code of the input code stream written to the external storage device 1022 will be decremented to zero, while on the other hand the code stream on the memory 1012 will be decremented to 4.

The present invention may be further embodied in other specific forms without departing from the spirit or essential characteristics thereof. For instance, the video input function separated from the transmitter allows the processing load of the transmitter to be significantly decreased, resulting in a smaller size terminal with a longer battery life. More sophisticated services such as background synthesis may be readily provided.

It is to be understood that the present invention is not to be limited to the details herein given but may be modified within the scope of the appended claims.

What is claimed is:

1. A video or still image information generating apparatus comprising:
   a camera; and
   a processor unit operatively connected to the camera, for adding a copy protection code corresponding to a paid fee to a video bitstream or still image information created by the camera for output.

2. A video or still image information generating apparatus according to claim 1, further comprising a charge processor unit and a display unit, in which the display unit displays a paid fee and the number of allowed copies which is fixed in correspondence with the paid fee.

3. A video or still image information generating apparatus according to claim 1, further comprising:
   means for selecting a background; and
   a synthesizer for synthesizing the video bitstream or still image information with a selected background.

4. A video or still image information generating apparatus according to claim 1, further comprising:
   means for obtaining audio along with the video bitstream or still image information.

5. A video or still image information generating apparatus comprising:
   means for creating a video bitstream or still image information, and operable in a condition that an appropriate fee has been paid or will be paid at a designated time; and
   means for creating a copy protection code to be associated with the video bitstream or still image information depending on a paid fee.

6. A video or still image information generating apparatus comprising:
   a communication interface connectable to an external terminal;
   a camera for creating and recording a video bitstream or still image information by video or still image recording in response to a start recording instruction from a user when an appropriate fee has been paid;
   a display unit for displaying a recorded video bitstream or still image information; and
   means for feeding to said external terminal via said interface, the video bitstream or still image information together with a copy protection code created depending on an amount of a paid fee in response to an instruction from the user indicating that the video bitstreams or still image information displayed is acceptable.

7. A video or still image information generating apparatus comprising:
   camera means for creating and recording video or a still image for a predetermined period of time in response to a start recording instruction from a user in a condition that an appropriate fee is paid or positively charged;
   means for generating an ID uniquely identifying a recorded video or still image; and
   transmitter means for transmitting said ID to a terminal and for transmitting said ID with said recorded video or still image to a server.

8. A video or still image information generating apparatus according to claim 7, wherein:
   a copy protection code corresponding to an amount of a paid fee is incorporated in said ID.

9. A video or still image information generating apparatus, comprising:
   a communication interface connectable to a server;
   a camera responsive to a start recording instruction from a user, for creating and recording a video bitstream or still image information for a predetermined period of time;
   display means for displaying a recorded video bitstream or still image information;
   means for feeding to said server, via said interface, the video bitstream or still image information together with a copy protection code created in correspondence with an amount of a paid fee in response to an instruction from the user indicating that the video bitstream or still image information displayed is acceptable.

10. A video or still image distribution server comprising:
    means for receiving and storing into a storage a video bitstream or still image information in association with a first ID uniquely specifying the video bitstream or still image information;
    means for receiving from a communication terminal, a transmission request including destination information and a second ID identifying the video bitstream or still image information, retrieving from the storage a video bitstream or still image information having the first ID matched with the second ID, and distributing the retrieved video bitstream or still image information to a destination specified by said destination information;
    wherein the first ID includes a copy protection code, and the server includes a management unit for updating the copy protection code for each time of distribution so as to inhibit the distribution of the video bitstream or still image information when the copy protection code reaches a predetermined number.

11. A video or still image information system comprising:
    a video or still information generating apparatus;
    a first multimedia communication terminal; and
    a distribution server,
    wherein said video or still information generating apparatus comprises:

means for creating a video bitstream or still image information in a condition that a necessary fee is paid or will be positively paid at predetermined time; and means for relating a copy protection code corresponding to a paid fee to the video bitstream or still image information;

wherein said first multimedia communication terminal comprises:

a storage device for storing the video bitstream or still image information transferred from said video information generating apparatus;

a memory for storing the copy protection code transferred from said video information generating apparatus together with the video bitstream or still image information;

transmission means for transmitting the video bitstream or still image information stored in said storage device to a specified destination; and controller means for inhibiting the transmission means from transmitting the video bitstream or still image information when the number of allowed copies specified by the copy protection code becomes zero; and wherein said distribution server transfers the video bitstream or still image information received from said first multimedia communication terminal to a second multimedia communication terminal at said specified destination.

12. A video or still image information system comprising:
a video or still information generating apparatus;
a distribution server; and
a first multimedia communication terminal;
wherein said video or still information generating apparatus comprises:

means for creating a video bitstream or still image information in condition that an appropriate fee is paid or will be positively paid at a predetermined time;

means for outputting the video bitstream or still image information together with a copy protection code issued in correspondence with a fee paid; and means for outputting an ID identifying the video bitstream or still image information;

wherein said video distribution server is configured to receive and store the video bitstream or still image information as well as the ID identifying the video bitstream or still image information;

wherein said first multimedia communication terminal comprises:

means for receiving and storing the ID identifying the video bitstream or still image information stored in said video distribution server;

means for creating a destination; and means for transmitting the ID and the destination to said video distribution server to request said video distribution server to distribute the video bitstream or still image information; and wherein said video distribution server further comprises means for comparing the ID received from said first multimedia communication terminal with the ID received from said video information generating apparatus in order to retrieve a requested video bitstream or still image information in the storage and to distribute the requested video bitstream or still image information to a second multimedia communication terminal specified by said destination.

13. A video information generating apparatus comprising:
a communication interface provided to interface with an external terminal;
a charge processor;
a camera for creating output of a video bitstream by video recording for a predetermined period of time in response to a start recording instruction from a user, when an appropriate fee has been paid to the charge processor;
a display unit for displaying a recorded video bitstream;
means for feeding to said external terminal, via said communication interface, the video bitstream added to a copy protection code created depending on an amount of a paid fee in response to an instruction of the user indicating that the video displayed is acceptable; and
means for enabling a visual display of the number of copies allowed of the video recording and the paid fee corresponding thereto.

14. A video information generating apparatus according to claim 13, further comprising:
means for selecting a background;
a synthesizer for synthesizing the recorded video bitstream with a selected background.

15. A video information generating apparatus according to claim 13, wherein an audio bitstream is obtained along with said camera to feed the audio bitstream to said external device along with the video bitstream.

16. A video information generating apparatus according to claim 13, further comprising:
a copy protection code manager for managing the number of copies by extracting the copy protection code from the video bitstream; and
a controller for inhibiting transmission of the video bitstream, via said communication interface, when the number of allowed copies becomes zero (0).

* * * * *